United States Patent
Maki-Korte

(10) Patent No.: US 7,770,497 B2
(45) Date of Patent: Aug. 10, 2010

(54) METHOD AND APPARATUS FOR CUTTING A CORE

(75) Inventor: Tomi Maki-Korte, Tampere (FI)

(73) Assignee: Raumaster Paper Oy, Rauma (FI)

( * ) Notice: Subject to any disclaimer, the term of this patent is extended or adjusted under 35 U.S.C. 154(b) by 137 days.

(21) Appl. No.: 11/667,199

(22) PCT Filed: Jan. 23, 2006

(86) PCT No.: PCT/FI2006/000020

§ 371 (c)(1),
(2), (4) Date: May 7, 2007

(87) PCT Pub. No.: WO2006/079680

PCT Pub. Date: Aug. 3, 2006

(65) Prior Publication Data

US 2007/0272062 A1    Nov. 29, 2007

(30) Foreign Application Priority Data

Jan. 26, 2005    (FI) .............................. 20050080

(51) Int. Cl.
B23B 3/00    (2006.01)
B23B 1/00    (2006.01)
(52) U.S. Cl. ........................... 82/1.11; 82/47
(58) Field of Classification Search ............. 82/47, 82/70.1, 70.2, 1.11, 46, 48; 29/27 R, 27 C, 29/558; 83/56, 924
See application file for complete search history.

(56) References Cited

U.S. PATENT DOCUMENTS

| | | | | |
|---|---|---|---|---|
| 1,782,518 A | * | 11/1930 | Steps .......................... 166/227 |
| 2,467,281 A | * | 4/1949 | Walter et al. ..................... 26/1 |
| 3,146,655 A | * | 9/1964 | Ghisoni ..................... 83/411.3 |
| 3,238,846 A | * | 3/1966 | Spencer et al. .............. 409/119 |
| 3,474,655 A | * | 10/1969 | Fulkerson ..................... 72/327 |
| 3,748,934 A | * | 7/1973 | Lezberg ......................... 82/48 |
| 3,933,063 A | * | 1/1976 | Stoffels ......................... 82/85 |
| 3,985,051 A | | 10/1976 | Brown |
| 4,084,463 A | | 4/1978 | Kanbara |
| 4,292,867 A | * | 10/1981 | Stoffels et al. ................. 82/47 |

(Continued)

FOREIGN PATENT DOCUMENTS

DE    7717683    9/1977

(Continued)

OTHER PUBLICATIONS

English Translation of Letter of Opposition of Core Link AG.

(Continued)

*Primary Examiner*—Will Fridie, Jr.
(74) *Attorney, Agent, or Firm*—Ladas and Parry LLP

(57) ABSTRACT

The invention relates to a method and an apparatus for cutting a sleeve to a predetermined length. The sleeve is first moved the direction of the longitudinal axis through a distance corresponding to the required cutting length, a rotating saw blade is driven through the outer surface of the sleeve but not through the inner surface, the sleeve is rotated through a first revolution whereupon the direction of rotation of the sleeve is set to be the same as the direction of rotation of the blade, the blade is driven through the inner surface of the sleeve and the sleeve is rotated until the cut extends around the sleeve.

4 Claims, 6 Drawing Sheets

U.S. PATENT DOCUMENTS

| | | |
|---|---|---|
| 4,361,064 A | 11/1982 | Sasaki |
| 4,438,672 A | 3/1984 | Sasaki |
| 4,693,149 A | 9/1987 | Sireix |
| 4,713,992 A | 12/1987 | Languillat |
| 4,794,684 A | 1/1989 | Vanlauwe |
| 4,827,816 A | 5/1989 | Takaniemi |
| 4,889,023 A | 12/1989 | Languillat |
| 4,934,225 A | 6/1990 | Languillat et al. |
| 5,014,924 A * | 5/1991 | Nowisch et al. .......... 242/526.3 |
| 5,170,684 A * | 12/1992 | Lofstrom .................... 82/70.1 |
| 5,313,862 A | 5/1994 | Johansson |
| 5,335,570 A | 8/1994 | Ro |
| 5,555,570 A | 9/1996 | Bay |
| 5,894,771 A | 4/1999 | Braun et al. |
| 5,964,024 A * | 10/1999 | Wallace ....................... 29/558 |

FOREIGN PATENT DOCUMENTS

| | | |
|---|---|---|
| EP | 0 085 248 | 8/1983 |
| EP | 0 177 418 | 4/1986 |
| EP | 0 826 467 A1 | 3/1998 |
| GB | 2 120 591 | 5/1983 |
| JP | 186094 | 7/1995 |
| JP | 180536 | 7/1998 |
| SE | 525 942 | 3/2004 |

OTHER PUBLICATIONS

Finnish Patent F1119419.

* cited by examiner

METHOD AND APPARATUS FOR CUTTING A CORE

The present invention relates to a method and an apparatus for cutting a sleeve used in paper manufacture as a roll core to a predetermined length.

The core is cut from a long master sleeve/core to a length corresponding to the width of the paper roll. After the cutting, the cores are moved to a winder, where a paper web is reeled onto the cores.

In core cutting, a sawing technique known from circular saws and an slitting technique known from tube cutters are applied. Slitting can be applied in the first place to cut thin-walled cores preferably made from the softest material. This technique has the advantage that the cutting doesn't produce any waste. The present invention relates primarily to cutting by a material-removing technique. In the following, this technique is referred to as a sawing technique and the device applying it as a saw.

Prior art is described e.g. in patent specifications SE 352 013, DE 4021134, DE 3803553 and in patent application FI 925 253.

The prior-art sawing technique has several drawbacks. The cutting accuracy is not sufficient for the requirements of the most demanding applications. After the winder, the rolls in the set of paper rolls are separated from each other e.g. by using a typical array of separating stop gages as described in patent specification FI 97126. If the set consists of a large number of narrow rolls, then the accuracy requirement becomes more pronounced. The cutting inaccuracy of an individual core, which typically is +/−0.5 mm, being repeated from core to core, leads to a situation where a core in the set extends into the adjacent roll by as much as 10 mm. Therefore, the rolls have to be separated from each other manually by wedging.

A central reason for the inaccuracy of the cutting length is the currently used method of determining the length. The core is pushed against a mechanical limit. Even if the mechanical limit is positioned ever so accurately, this will not lead to a corresponding cutting accuracy. The core is rotated during the cutting operation.

Since the core end placed against the mechanical limit is not straight, the deviations of shape cause axial displacement of the core as it is being rotated, and this results in the above-mentioned inaccuracy.

The mechanical limit additionally has to be so constructed that it will work over a wide range of diameters and allow the removal of sawing waste by suction. Therefore, the mechanical limit must not cover the core end entirely.

Dust produced by saws and poor operation of suction systems are common problems associated with prior art. Dust involves a risk of explosion and also a health risk. Efficient dust removal systems are expensive. For safety reasons, dust extraction equipment has to be placed outside the building.

Prior-art solutions also involve drawbacks in the measuring and power transmission techniques, which have an importance regarding the accuracy of longitudinal positioning of the core. Wear of the blade leads to further inaccuracy.

The invention provides a significant improvement in sawing accuracy and dust formation problems.

The amount of uncontrolled saw dust is substantially reduced, because the dust spray can be directed more accurately. No burr is produced, which has an effect on the accuracy.

In more precise terms, the invention is characterized by what is disclosed in the characterization parts of the independent claims.

In the following, the invention will be described in detail with reference to the attached drawings.

FIG. 1 presents a state-of-the-art sawing arrangement.

Figure 6:
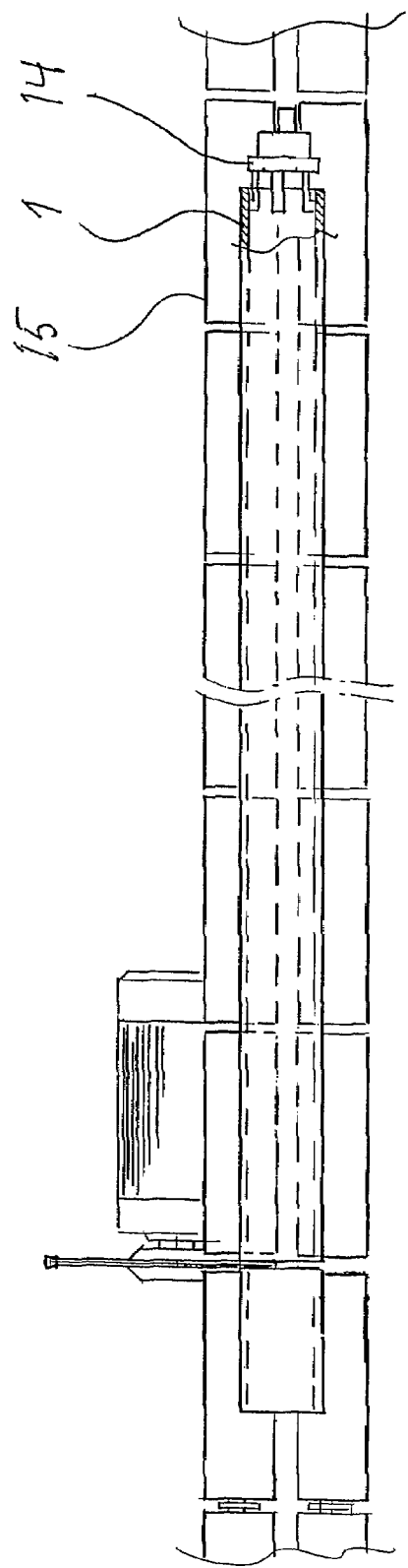

FIG. 6 presents a simplified top view of a sawing apparatus according to an embodiment of the invention.

Figure 1:
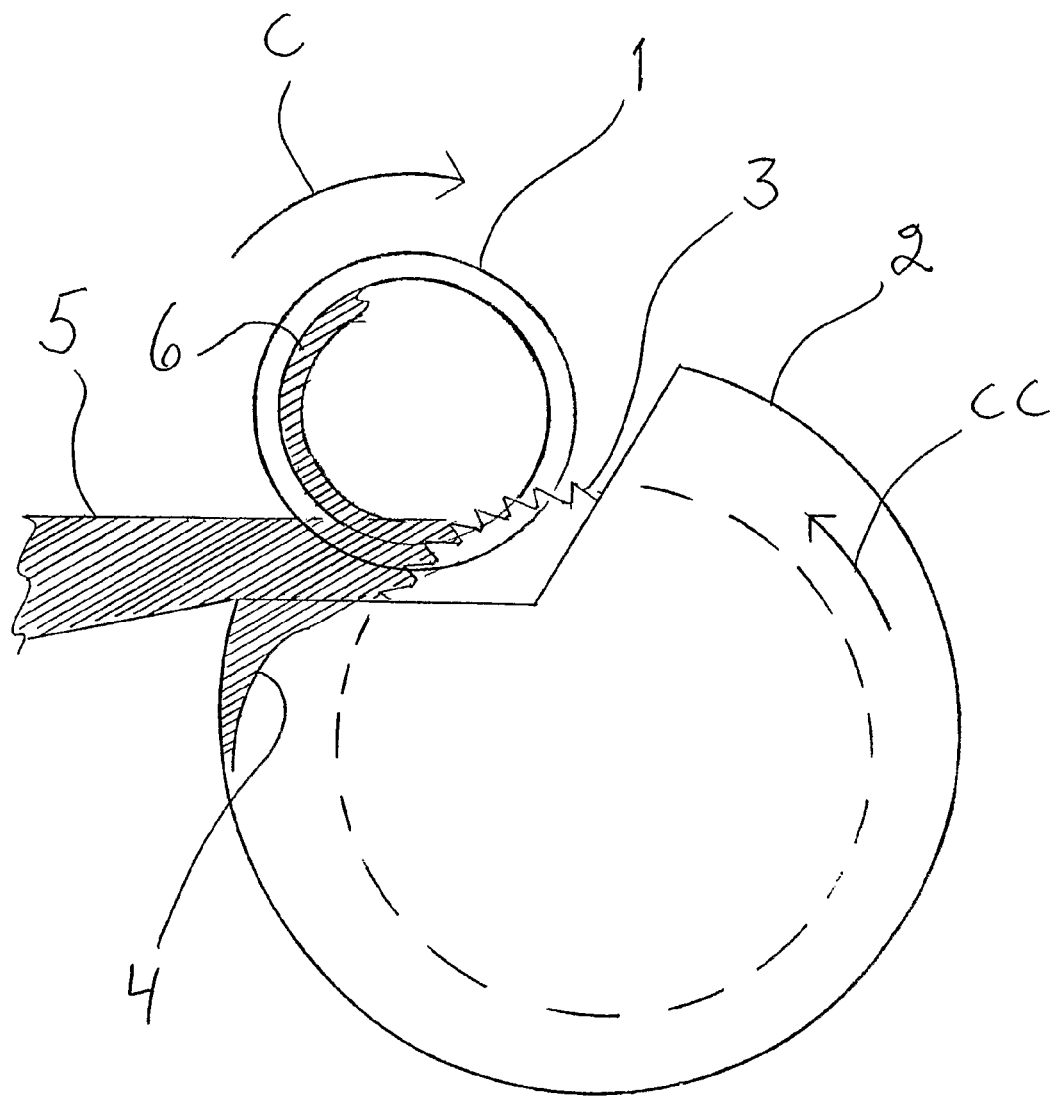

In the embodiment presented in FIG. 1, illustrating prior art, a core 1 is rotated clockwise in the direction of arrow C. A blade rotating in the opposite direction is driven during the sawing through the wall of the core 1, also through its inner surface. The dust spray is dispersed, consisting of three main portions:

A significant portion 5 is flung in an uncontrolled manner into the environment. One portion 6 remains inside the core. The remaining portion 4 enters inside the blade guard as is desirable. Of these, portions 5 and 6 are very harmful. The inside of the core 1 has to be cleaned before the core is passed on into the further process. The cleaning is performed by applying suction, which does not always guarantee a good final result. Portion 5 of the spray causes environmental problems.

When a short piece is being sawn, even the dust spray hitting the inner surface of the core bounces partly into the environment even if a strong suction prevails inside the core.

The core is rotated until the cut extends around the core. The cut looks clean on the outer surface of the core, but a burr is formed on the inner surface.

Figure 2:
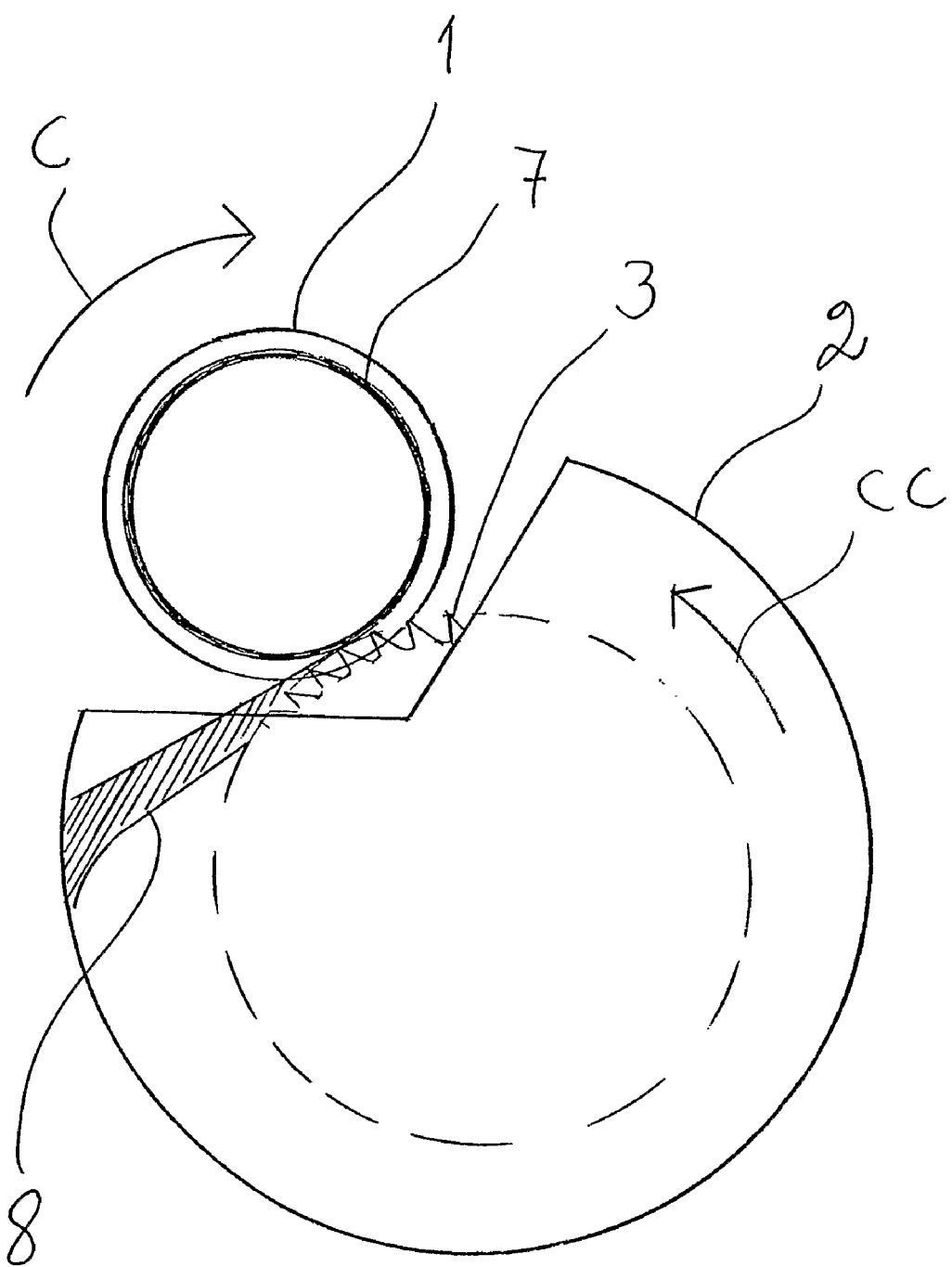
FIG. 2 illustrates a first stage of work in a sawing arrangement according to an embodiment of the invention.

FIG. 2 illustrates a first work stage in an embodiment according to the invention. The core 1 is preferably rotated in the opposite direction relative to the blade 3; for example, the core is rotated clockwise C and the blade counter-clockwise CC.

The blade 3 is driven through the outer surface of the core but not through the inner surface. The core is preferably rotated through one revolution. As the blade cuts towards the outer surface of the core, the outer surface of the core remains clean/burrless. Since there remains a thin, solid circular surface 7 under the cut, no cutting dust can get inside the core. Practically the entire dust spray 8 is directed to the inside of the blade guard 2.

Figure 3:
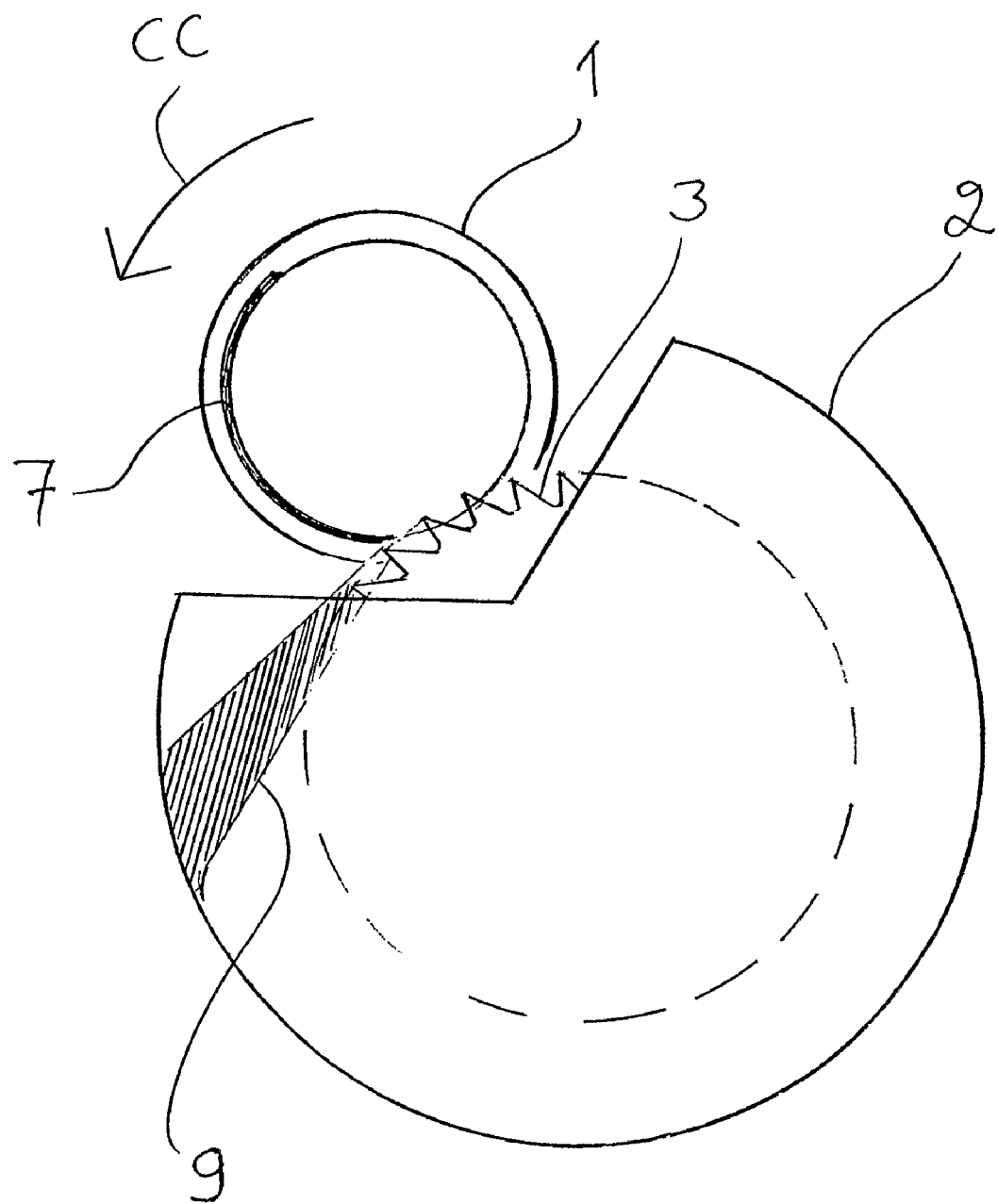
FIG. 3 illustrates a second stage of work in a sawing arrangement according to the above-mentioned embodiment of the invention.

Next, the direction of rotation of the core 1 is reversed so that the core rotates in the same direction with the blade, preferably counter-clockwise CC. As illustrated in FIG. 3, i.e. stage 2, the blade 3 is driven through the inner surface of the core 1, and the core is rotated until the cut extends completely around the core.

Due to the reversal of direction, the blade cuts towards the inner surface of the core, and no burr is formed. The entire dust spray 9 is directed to the inside of the blade guard 2 and can be easily recovered.

Figure 4:
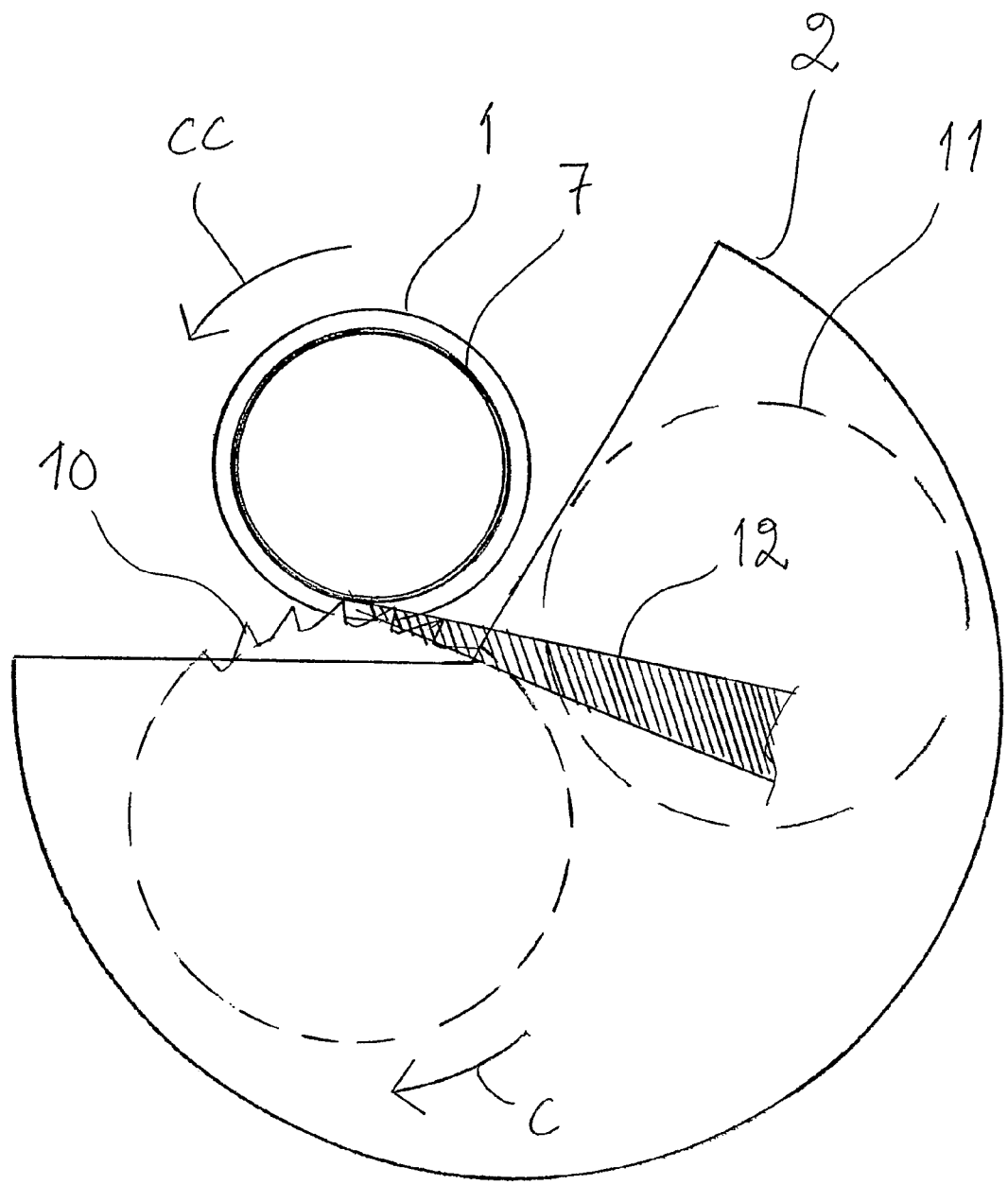
FIG. 4 illustrates a first stage of work in a sawing arrangement according to a second embodiment of the invention.

FIG. 4 illustrates a first work stage in a sawing process according to a second embodiment of the invention. The core is rotated in a direction CC opposite to the direction of rotation C of a first blade 10. The first blade 10 is driven through the outer surface of the core 1 but not through the inner surface. The core is rotated until the cut extends to a point opposite a second blade 11.

Figure 5:
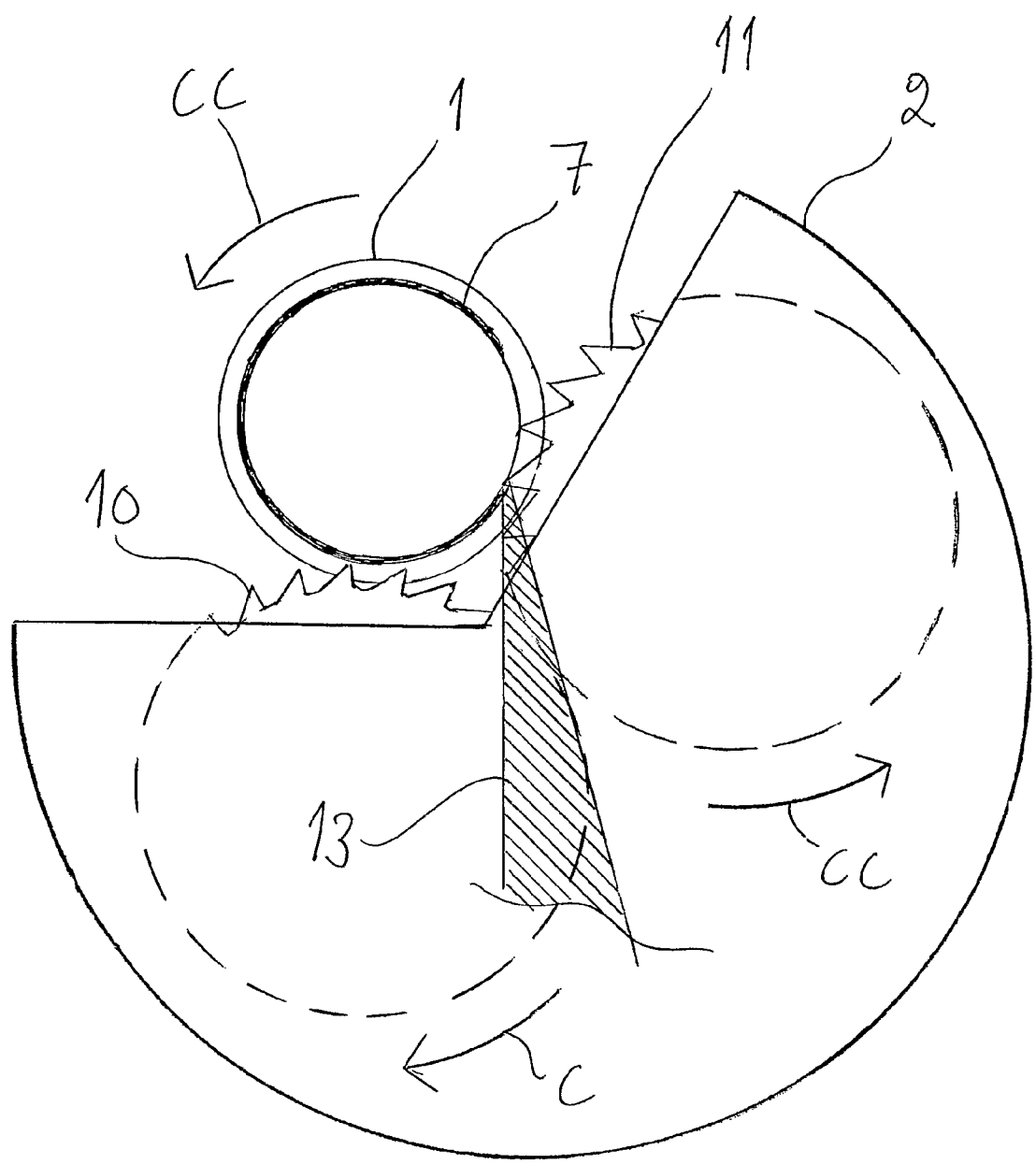
FIG. 5 illustrates a second stage of work in a sawing arrangement according to the aforesaid second embodiment of the invention.

In a second stage as illustrated in FIG. 5, the second blade 11 rotates in direction CC, i.e. in the opposite direction relative to the first blade 10. The second blade is driven through the inner surface of the core. The core is rotated until the cut extends around the core.

In both stages, the dust sprays 12, 13 are directed safely to the inside of the blade guard 2. In both machining operations, the blades cut against the surfaces. In this way the dust can be recovered in a controlled manner, and no burr is formed at the cutting surfaces.

The sawing apparatus mainly consists of known devices. The core is rotated by a roller provided with a drive and leaning against the core. The core rests on two parallel rows of rollers 15. Operation is started by first moving the core in the direction of the longitudinal axis through a distance corresponding to the required cutting length and then rotating the core (1) about its longitudinal axis and driving the rotating saw blade through the surface of the core.

In the apparatus of the invention, the distance of longitudinal movement of the core is preferably measured using a band-type measuring element which does not require the use of rotating power transmission.

Instead of using mechanical limits, the core is gripped at its end, inside the core, by a gripping element 14, which then moves the core in the lengthwise direction. The length of the distance of movement of the gripping element is measured by means of a measuring element.

The wear of the blade is either measured or estimated according to exploitation time. The effect of wear is compensated by correcting the determination of positioning. The measuring and positioning elements/system are in themselves known from CNC machine tools and industrial robots. Likewise, the compensation of blade wear is known from adaptive machine tool control systems.

The details of the invention may vary in the scope of the following claims.

The invention claimed is:

1. A method for cutting a sleeve (1) for a paper roll core to a predetermined length by first moving the sleeve (1) in the direction of its longitudinal axis through a distance corresponding to the required cutting length and then rotating the sleeve (1) about its longitudinal axis and driving a rotating saw blade through the surface of the sleeve (1), characterized in that the sleeve (1) is rotated through a first revolution, during which the saw blade is not driven through the inner surface of the sleeve (1) wherein the sleeve (1) and the blade rotate in different directions during the first revolution, and after this the direction of rotation of the sleeve (1) is set to be the same as the direction of rotation of the blade, the blade is driven through the inner surface of the sleeve (1) and the sleeve (1) is rotated until the cut extends around the sleeve (1).

2. A method according to claim 1, characterized in that, during the first revolution, the sawing not penetrating the inner surface of the sleeve (1) is performed by a first blade (10) and the cut is sawn open, so that it extends around the sleeve (1), by a second blade (11) rotating in the same direction with the sleeve (1).

3. A method according to claim 1, characterized in that the sleeve (1) is gripped at its end from inside by a gripping element, the distance of longitudinal displacement of which determines the length of the sleeve (1) to be sawn off.

4. A method according to claim 1, characterized in that the wear of the blade is either measured or estimated according to exploitation time and that the effect of wear is compensated by correcting the determination of positioning.

* * * * *